E. E. RIES.
METHOD OF AND APPARATUS FOR DETECTING AND LOCATING SOUNDS, &c.
APPLICATION FILED JUNE 20, 1912.
1,385,795.
Patented July 26, 1921.
5 SHEETS—SHEET 4.
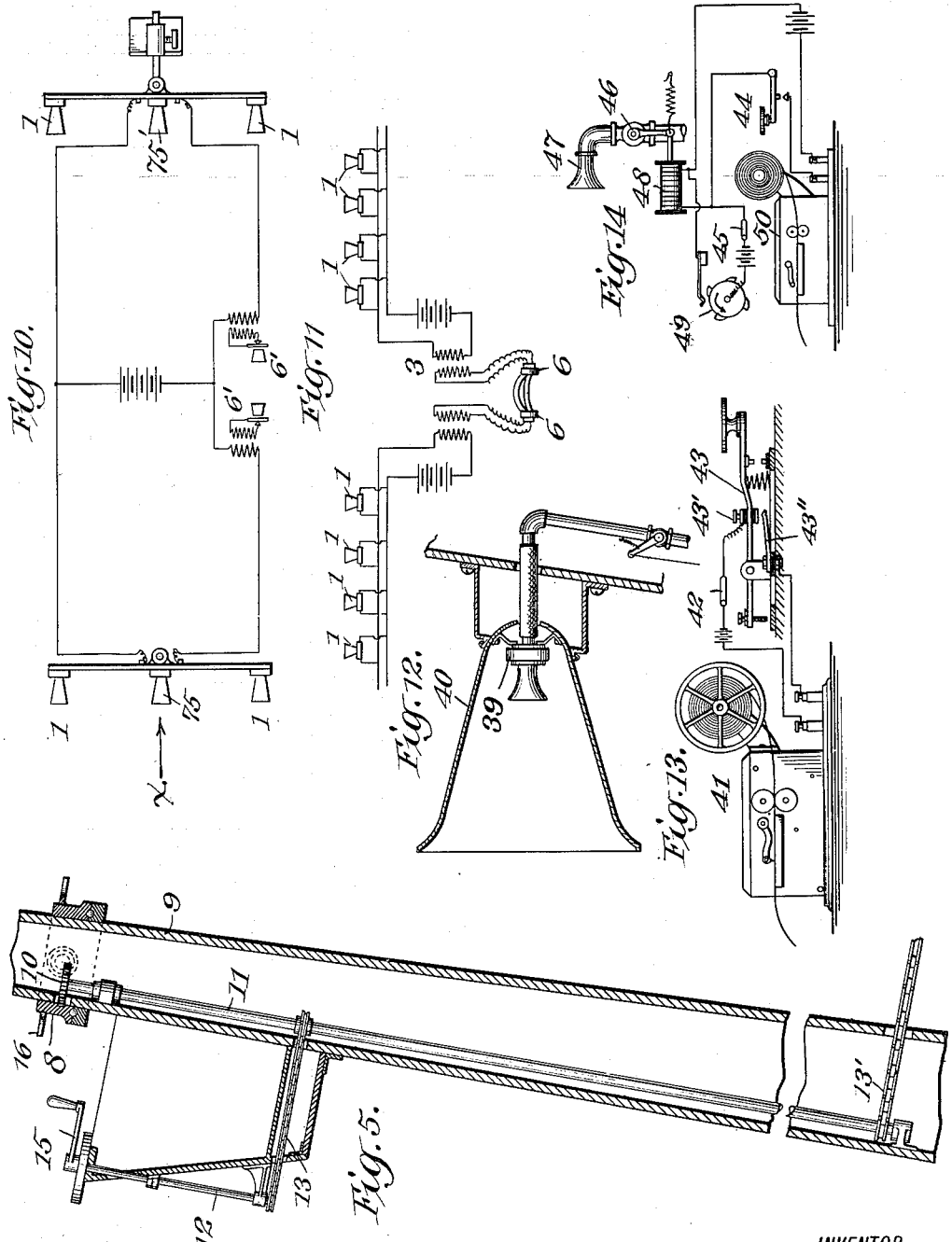
WITNESSES
INVENTOR
ELIAS E. RIES.
BY
ATTORNEYS E. E. RIES.
METHOD OF AND APPARATUS FOR DETECTING AND LOCATING SOUNDS, &c.
APPLICATION FILED JUNE 20, 1912.
1,385,795.
Patented July 26, 1921.
5 SHEETS—SHEET 5.
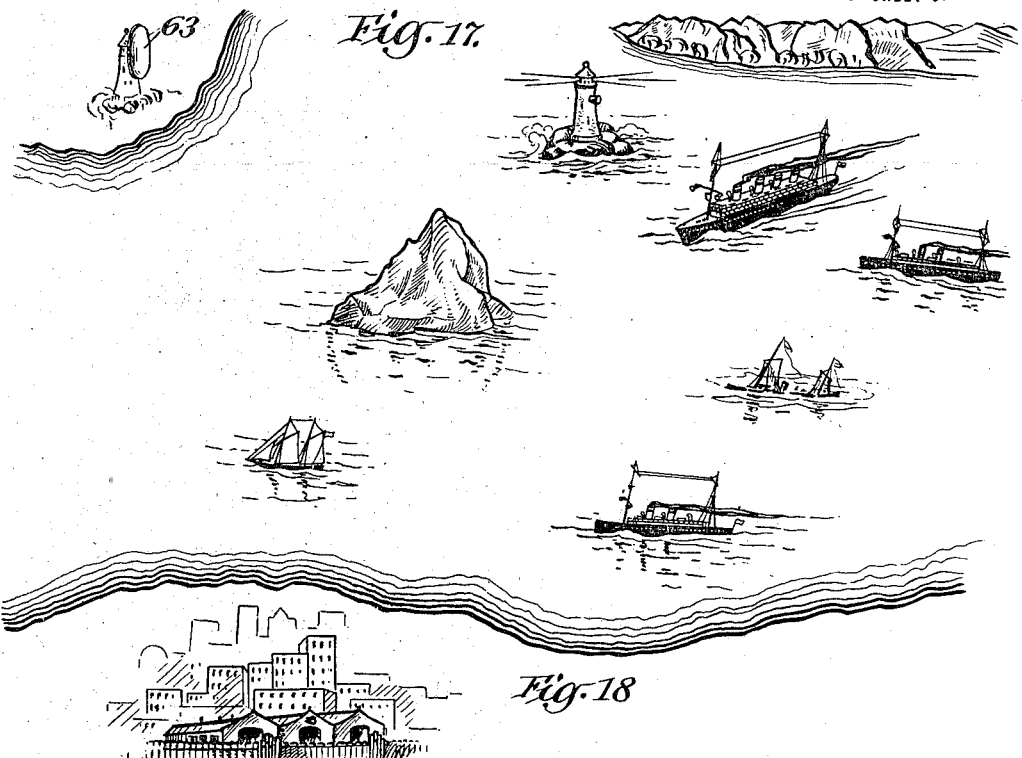
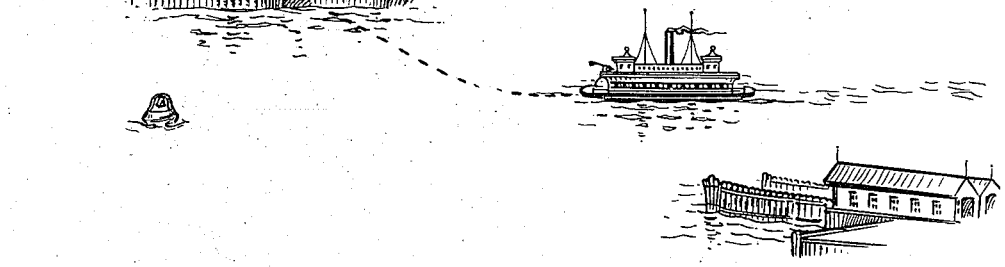
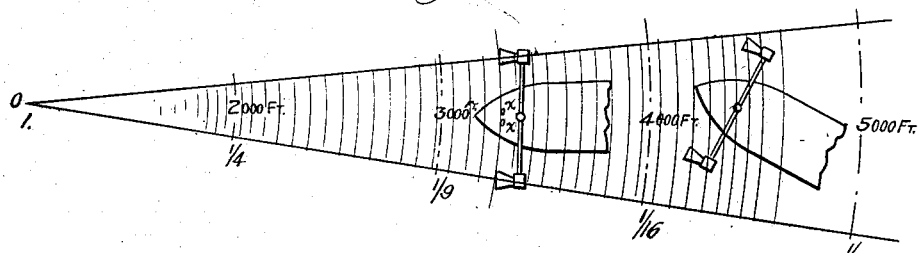
WITNESSES
INVENTOR
ELIAS E. RIES
BY
Townsend & Decker
ATTORNEYS

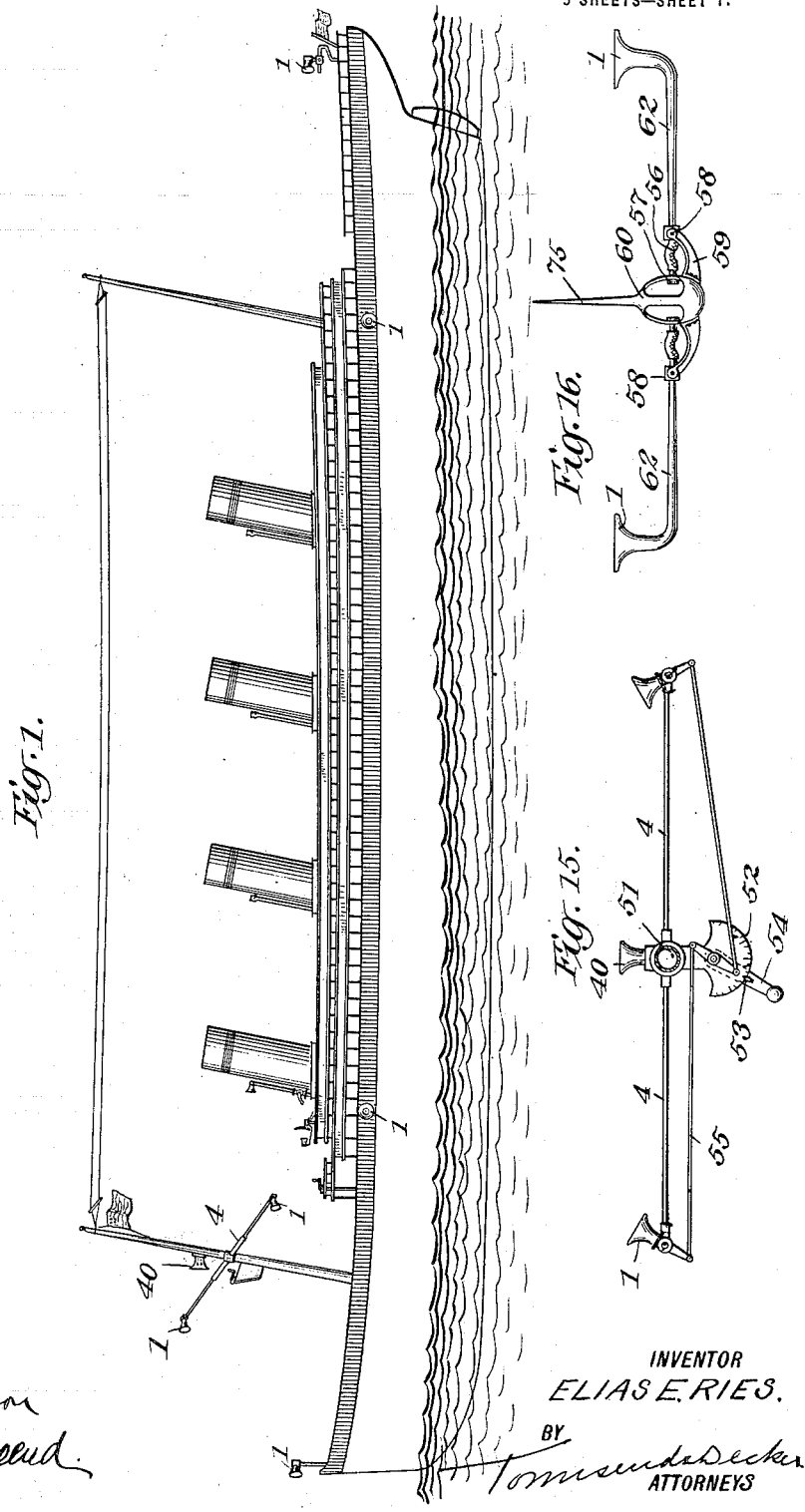

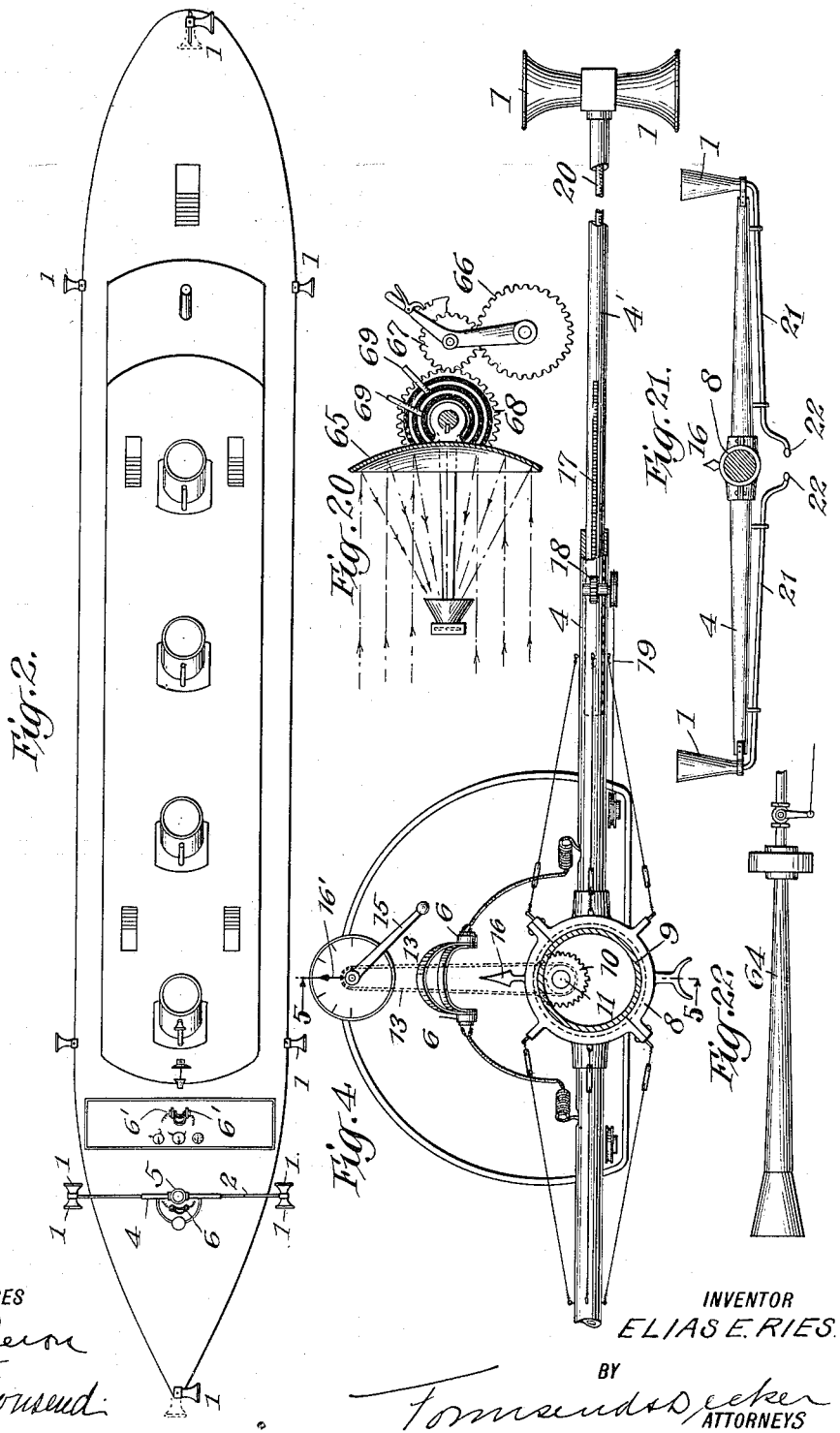

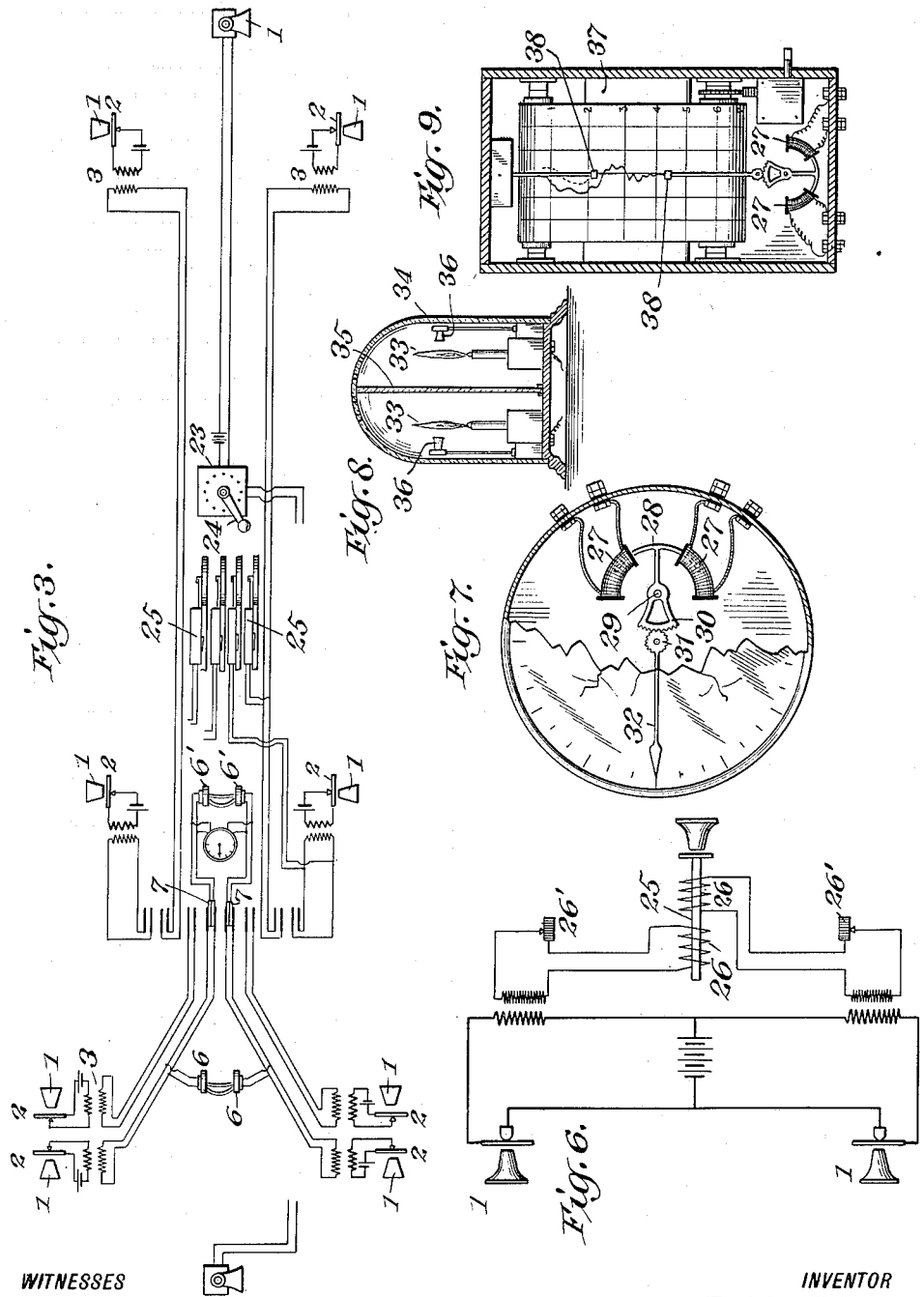

UNITED STATES PATENT OFFICE.

ELIAS E. RIES, OF NEW YORK, N. Y.

METHOD OF AND APPARATUS FOR DETECTING AND LOCATING SOUND, &c.

1,385,795.  Specification of Letters Patent.  Patented July 26, 1921.

Application filed June 20, 1912. Serial No. 704,713.

*To all whom it may concern:*

Be it known that I, ELIAS E. RIES, a citizen of the United States, and a resident of New York, in the county of New York and State of New York, have invented certain new and useful Improvements in Methods of and Apparatus for Detecting and Locating Sounds, Etc., of which the following is a specification.

My invention relates to certain novel and useful methods of and appliances for more accurately and readily detecting and locating the source or point of origin of audible sounds or signals than is possible with the unaided ear, especially at long range or when the source of sound is invisible, as in fogs, etc. It also provides means for ascertaining the exact nature and distance of the sound, and also if desired, for magnifying, registering or recording the sound and utilizing it for signaling, etc.

My invention may take a large number of forms and has many uses on land and sea, chief among which are its applications for the prevention of collisions between vessels at sea, especially in fog, the location of bell buoys and other warning signals and danger points at night, the transmission and reception of audible signals as well as of inaudible signals or messages between vessels under conditions where the same is at present impossible, the more accurate and, if necessary, automatic guiding of vessels, etc.

The means for detecting, locating and ascertaining the distance and exact position of the sound may (according to the application of my invention), be either purely auditory, or a combination of acoustic and electrical, in conjunction with aural observation or self-registering indication, as more fully hereinafter set forth.

My invention is applicable to and intended to be used for the detection and location of the source or sources of any given sound or sounds, whether transmitted through the air, water, or any other sound conducting or transmitting medium, and also for the transmission and detection and for the reception of signals and impulses transmitted through any one or more of such sound conducting media, whether such signals and impulses are of a strength, character or periodicity that are audible, as well as such that are inaudible to the human ear. Furthermore, my invention may be and is designed and intended to be employed by me in its various aspects and combinations for the transmission of messages of audible as well as an inaudible or secret character, and for this purpose I provide instrumentalities by which interference or confusion between a plurality of messages being transmitted from different points, stations or vessels at the same time may be overcome and avoided.

My invention is likewise applicable to and is intended to be used for the detection and prompt location by means of vibrations or impulses transmitted through the air, water or other sound-conducting medium, or any one or more of these separately or in combination, of vessels, vehicles and other statinary or moving objects hidden fom direct view, whether said vessels, vehicles or objects be upon land in the air, or upon or under the sea.

Among other purposes of my invention is the insurance of the same navigation of vessels and vehicles in time of peace, and of the detection and destruction of hostile vessels and vehicles in time of war, whether such be moving in the air, upon land, or upon or under the sea or other body of water. Included in these objects is the prompt detection, location and destruction of hostile aircraft, of hostile submarine vessels, of submarine torpedoes and of other hostile craft and objects whose position is or may be indicated either by the vibrations or sound due to their propulsion, or which are susceptible of being located by reflected echoes of either audible or inaudible sounds or impulses transmitted through such sound conducting media.

The underlying principle is that of employing two coöperating widely separated sound receivers, preferably adjustably and rotatively mounted together upon a pivotal support, consitituting a movable base line of a triangle whose apex is the distant point from which the sound emanates. The uniformity or equality of the sound in both receivers, (connected with the corresponding ears or with the recording device) indicates when the base has been moved so as to bring its center perpendicular to the direction of the source or apex of the triangle described by the base and the lines joining the apex with the receivers.

The converging or focusing of the sound receivers upon the source of sound to give the maximum intensity of sound in the observing or indicating apparatus furnishes, by the angle made between the base line and the side of the triangle, the means for indicating or reading the distance of the source.

I will first describe the nature and construction of apparatus embodying my invention and the general applications and manner of use of the same, and will then describe more in detail the special forms of apparatus shown in the accompanying drawings.

The sound receiving devices are preferably constructed to gather large volumes of sound which may be in the form of vibrations of either audible or inaudible character and of any desired pitch and intensity, and therefore embody either a sound-gathering mouthpiece or funnel like that of a megaphone receiver, or a sound surface which reflects and focuses sound. These sound receiving and collecting devices are mounted as far apart as possible or convenient on a suitable support capable of being turned in a horizontal plane to vary the direction of a base line connecting said receiving devices and the direction of presentation of their sound receiving or collecting surfaces to the location of the sound.

For this purpose they may be mounted at the extremities of a swinging arm pivoted upon a suitable support, as for instance in the case of use on ship-board they may be mounted on an arm like a yard arm capable of being revolved about the forward mast of the steamship, preferably in a position above the crow's nest where the latter is used, as in the case of steamships or naval vessels, etc. Instead of being mounted upon the foremast, the swinging arm may with advantage be mounted upon a vertical pole mounted at the bow of the ship, where it can be swung about with greater freedom and less interference. Again, especially when my apparatus is to be installed on large ocean liners, war vessels and other high speed craft, a supplemental set or sets of my sound receivers may be mounted at considerable distances apart fore and aft of the ship so that by swinging the ship the direction of the base line between them will be changed.

Electrical or mechanical connections may be established between the sound receivers and suitable indicating devices, whereby their angle to the base line when they are focused upon the source of sound may be read or indicated directly in terms of the angle or indirectly in terms of the length of the perpendicular described from the apex of the triangle where the sound is located, to the base line.

When the instrument is used simply for ascertaining the direction from which a sound comes, the two sound collecting funnels or receivers may be mounted on the end of arms, the inner ends of which are provided with ear-pieces or other similar devices by which the received sound may be heard in the ears of the observer who, with the ear-piece applied to his ears, simply faces in the apparent direction of the sound and ascertains its exact direction by observing when the sound is equal in both ears or of maximum strength or intensity, just as he would do if unprovided with any special appliance and were to depend upon natural audition unassisted.

The uniformity or intensity of sound collected or gathered by the sound collecting or receiving devices which indicates by the position of the base line at such time the direction from which the sound comes, may be observed or indicated either by the ear or by suitable sensitive indicating appliances responsive directly or indirectly to differences in the intensity or sound. When the sound-receiving devices embody a microphone or telephone transmitter it is obvious that any electrical indicator will suffice; likewise in such case of employment of the microphone, a telephone receiver or receivers embodied in the headpiece may be used by the observer to directly observe by audition, the strength of the sound. Any suitable means, however, may be used for ascertaining the sound intensity for the purpose of determining when the sound receivers are directed in such manner that their base line is perpendicular to a line described directly from the source.

In the case the movable cross-arm is mounted on a fixed pivotal support, said arm may be as long as or longer than the width of the vessel, and, by making the same telescopic, can be materially extended. The sound receivers, in one form of my invention, may be connected directly by ear tubes with the ears of the lookout or other person who, by means hereinafter described, can readily swing the cross or yard arm into any desired position, preferably substantially in a horizontal plane.

In another and for many cases preferred form of my invention, I provide each of these receivers at their inner extremities or base, with a telephone or microphone transmitter, the same being preferably connected with a common battery, and included in circuit with an ordinary telephone head instrument containing preferably two telephone receivers, one for each ear. In this manner a sound coming from a distant fog horn or siren of another vessel, when heard in either or both of these receivers, can be accurately located by swinging the arm, which constitutes a movable base line, until the sound in both telephone receivers is harmonious and of equal strength, when it will be found that the source of sound is directly perpendicular to the center of the base line of which the two sound-collecting receivers are the terminals. A pointer fixed to this central part of the arm or base and moving over a scale will then point directly to the source of sound and indicate its exact direction. The two megaphone receivers may furthermore be swung inwardly to a greater or less extent for focusing them upon the source of the sound, and the exact distance of the source of sound can be immediately read off by the lookout or other person in charge from a suitable pointer and scale connected with one or both of them, so that the commander of the vessel may know at once and without any loss of time spent in triangulation calculations, the exact point and distance from which the sound emanates. If this sound comes from a siren of a vessel in distress he can steer directly to it, or if it be from a vessel in a fog that is sailing or steaming toward him, he can as readily turn aside to evade and avoid colliding with it.

In the same manner the device can be effectively utilized as a protection against collision of a vessel with icebergs, bell buoys, derelicts, reefs, coast and shore lines, etc., as well as with sailing vessels not provided with sound producing apparatus, and it is especially useful for this purpose in thick fogs and on dark nights, when these obstructions or points of danger are invisible.

It should be here stated that under the circumstances just mentioned, namely, during heavy fog, thick haze and on dark nights, the atmosphere becomes a far better medium for the transmission of sound and acoustic vibrations generally than it is during ordinary weather conditions, and on warm, partly cloudy days. It is therefore just at the particular times when safety signals at sea are most vitally needed, as is the case in fog and thick weather, that my invention operates at its highest efficiency and over much greater effective distances for a given intensity of the original sound. It is because the air when holding the haze or fog in suspension is in a highly homogeneous condition, that the transmission of sound waves through the same is so greatly improved. Experiments have demonstrated that air in this condition is "acoustically transparent", and also that neither fog, rain, hail or snow have any sensible power to obstruct the sound.

It has been stated that "an iceberg carries no side-lights". It is however an excellent reflector of sound waves, but usually an echo from an ordinary fog horn, reflected from the exposed portion of an iceberg, cannot always be detected by the ears of a lookout or other person, or if detected, cannot be located. This is owing to the lack of sensitiveness of the human ear and to the short distance or base line, amounting to but six or seven inches in the average individual, which separates one ear from the other, thereby making it impossible, even if a sound coming from a considerable distance is faintly heard, for him to ascertain its direction and nature.

By means of my invention I provide not only an artificial base line may times greater than that afforded by a pair of human ears, but also provide for the gathering of a very much greater area of the wave front, impinging upon my megaphone receivers, and for the reinforcement and concentration of the sound due to same, however distant the source of sound originating such waves in the atmosphere.

Furthermore, these waves are, by my apparatus, greatly intensified, so that a sound that would be utterly inaudible to the naked ear can be readily detected, and for distances very much greater than it is possible for the ear to perceive under ordinary conditions.

Indeed, so sensitive and accurate are the means that I have devised for this purpose, that my invention will readily enable the observer to distinguish the difference between sounds reflected from different bodies, so that the nature and character of the object is immediately ascertained by the nature of its echo. For example, my device will at once intimate to a trained ear whether the vessel is approaching an iceberg, a fog-bank, a sailing vessel, a rocky coast, etc., and even the breaking of the waves over a sunken reef or upon a distant shore or beach may be distinctly heard at a considerable distance. It will furthermore discriminate between the shadow and the substance, that is, it can distinguish between the sounds reflected by the fog that may envelop an iceberg and that reflected by the solid surface of the berg behind it.

For example:—It is well known that different objects reflect different proportions and qualities of an impinging sound, according to the extent and formation of the whole or any given or selected part of their reflecting surface or surfaces, the degree of hardness or elasticity of this surface in the case of solid bodies, such as rocks, earth, sails, etc. and their permeability or acoustic transparency in the case of vapors and gases, such as fog, moist or dry air, etc. Now, when the character, strength and duration of the original sounds are known, as will be the case when such sound is that produced by the siren mounted upon my focusing, sound-detecting, range-finding yard-arm hereinafter described, the nature of the sound reflecting body, or of a distant sound-producing object, although entirely invisible to the eye, will make itself clearly manifest to the ear.

A hard, uneven, rocky coast with its principal face at the apex of the isosceles triangle,—which is formed when my pivoted yard-arm with its central siren and its equidistant sound receivers at its extremities is turned in the direction of the sound,—will return a strong but somewhat uneven or slightly rumbling echo, which will be caught by the two receivers when, in exploring for obstructions, the yard-arm on the vessel is brought into a position parallel with any given portion of said face, irrespective of the distance separating the two, and this echo will be faithfully transmitted to the observer's head-phone and to my sound-recording instruments when the latter are also employed. If the distant coast line is such as to present a smooth, even surface, parallel with the adjusted yard-arm, the received echo will be unbroken. Should the unseen reflecting wall or any part thereof be concave, the received sound reflected from this surface will be still stronger. By swinging the yard-arm or pivoted base alternately into and out of its adjusted position, the form of the distant, invisible reflecting surface can thus be ascertained, under normal atmospheric conditions, with a very fair degree of accuracy.

A distant iceberg, on a dark but clear night, will likewise give a strong echo, whose characteristics will approximately disclose, in a similar manner, the general form and size of the berg. Should the berg, however, be enveloped or hidden by an intervening fog-bank, as is often the case, then my invention, owing to the extreme sensitiveness and range of my microphonic sound collectors, will accurately disclose this fact. In this case there will be a double reflection of the siren's blasts: one, the first in point of time, from the surface of the fog-blanket, which, just as in the case of clouds, will reflect a portion of the sound, and the other, the second in point of time, from the surface of the hidden berg behind it. The first reflection will be relatively weak, while the second will be stronger, since the berg, being solid, will reflect the whole of the sound reaching it. In fact, the time interval between the two reflections of any given blast will further apprise the navigator, with a considerable degree of accuracy, of the exact distance of the invisible berg behind the bank itself.

In the case of the waves breaking upon a distant, invisible shore, the sound is direct, instead of reflected, and will be detected by the receivers and its exact position and distance located by my apparatus without assistance from the siren. Since my invention for the first time does for the human ears what the invention of the binocular telescope does for the eyes,—that is to say, to bring within the range of audition distant sounds too feeble to affect the tympanum of the unaided ears, by greatly enlarging the sound-gathering power and then concentrating and magnifying the same, and in addition to this, performs the further function of greatly extending the normal angular distance or "parallax" between the source of sound and the ears,—it follows that, whereas under ordinary conditions a mariner must be fairly close to a shore in order to hear the beating of the surf, by my present invention he is automatically warned, in the darkest night and in the thickest weather, of his approach to a dangerous shore and of its approximate distance, location and general outline and character, while his vessel is yet many miles away, and thus prevent its grounding and possible destruction.

Even in case of diffraction of the sound by passing through a layer of air of different density, this could be ascertained by varying the frequency or pitch of the waves emitted by the siren and noting any corresponding variation in their direction from the normal, that would be due to the variation in the length of the different waves so sent out and reflected. For example, it is well known that a prism will refract different colors or wave lengths of light at different angles. Since sound waves follow a similar law, it is only necessary, in order to determine if a refracting layer exists, to speed the siren up or down so as to successively project certain selected sounds of different pitch, or its entire range of wave lengths. If the returning echo is heard uniformly as coming from the same direction or point of the compass under these conditions, it may be regarded as certain, even in the densest fog, that no refraction exists, and that the actual source of the sound lies directly ahead of my detecting apparatus in the direction shown by the pointer.

In this connection it should be pointed out that while the entire visible spectrum, having seven well-defined refractive indices, covers but a single octave, the range of audible atmospheric waves embrace approximately ten octaves, which should therefore lend themselves more readily to such measurements, so that the refractive effects of strata of varying densities and the corresponding corrections could readily be plotted in advance. This would, however, be of service mainly when my system is employed on clear, hot days for aerial signaling or communicating purposes between widely separated vessels or shore stations, but would not be necessary in the homogeneous atmosphere that is always present and generally intervenes between vessels shrouded in fog, and also at night, at which times my invention finds its greatest use for the purpose of preventing collisions.

When my invention is applied to a steamship and is used for the purpose of detecting icebergs or other obstructions, that cannot be detected by the eye on account of fog or darkness, I provide a siren or other source of sound which is arranged automatically to send out audible blasts at stated intervals.

This siren I preferably mount directly upon my swinging arm at its central portion, midway between my sound receivers, and with its horn or funnel pointing directly forward, so that whatever the position of the arm may be, the sound is always projected in a direction perpendicular to its base. Consequently, an echo returning from a surface directly ahead of the siren will impinge upon both of the widely separated sound receivers simultaneously, and the direction of the reflecting surface will thus be immediately ascertained, and its distance promptly determined.

The movable arm containing my megaphone receivers or my combined megaphone receivers and microphone transmitters, is operated and utilized for the purpose of locating and detecting the echoes, if any, that would be reflected back from the surface of the iceberg or other obstruction. If, for example, the siren is sounded four times a minute allowing three seconds' duration for each blast, there will be available an interval of twelve seconds for the sound of the siren to reach the iceberg and to be reflected from some point of its surface back to the vessel. Two blasts of the same duration a minute would allow a direct interval of twenty-seven seconds for the sound to reach the obstruction and travel back, and as sound travels through the atmosphere at the rate of about 1130 feet per second, it would cover a distance of something over a mile for each five seconds, so that the echo could be heard even if the iceberg were several miles distant from the vessel, in ample time to permit the vessel to change its course while sailing at full speed.

In addition to the movable arm already referred to, which is conveniently and readily operated to find the direction of the sound, I sometimes employ, especially on the larger ocean liners, one or more supplementary fixed megaphone receivers and microphone transmitters. For example, I may have a pair of widely separated fixed megaphone receivers on either side of the vessel, as well as another set of pivoted megaphone receivers at the bow end and stern of the steamship respectively, thereby affording a base line as long as the vessel, which may be 800 or more feet. These more widely separated instruments may be utilized to ascertain the exact distance and direction of sound waves coming from very great distances, by swinging the vessel around so as to bring its broadside perpendicular to the direction from which the sound emanates, as previously determined by the movable arm, which in this case would serve so to speak, as a "finder."

Other advantages are secured by the use of the fore and aft receivers, which will hereinafter more fully appear.

It will be understood that, unlike the various methods of sight triangulation, such as have heretofore been employed in range finders, the swinging arm of my sound detector and protractor forms a movable base line which will adjust itself so as always to constitute, when focused upon the source of sound, the base of an isosceles triangle of which the source constitutes the apex and is directly perpendicular to the center of this base, as already mentioned. Consequently, the operation of the apparatus is automatic, being governed entirely by the uniformity or equalization of the sound in both ears, so that the direction as well as the proximity or remoteness of the object is instantly indicated on the scale or protractor over which moves the pointer, which I provide for that purpose.

When my invention is used in connection with widely separated megaphone receivers located on either the starboard or port side of the vessel, I sometimes use another form of "finder," in which I employ an oscillating or rotating sound reflector mounted on an arm, which also carries a microphone transmitter which is placed with its mouthpiece in the focus of the reflector, so that the sounds coming from a distance, on striking the reflector surface, will be focused upon the microphone and transmitted to the head telephone of the navigation officer on the bridge, who can then turn the vessel with its broadside toward the direction from which the sound has been found to come, and thereby ascertain more accurately its precise nature and location by means of the broadside instruments already referred to.

My invention furthermore accomplishes other important functions, among them the transmission of code signals or messages by means of sound waves and their detection and reception by other vessels within signaling reach, thus establishing a method of long-range communication by means of sound waves at very considerable distances, under conditions where the sound itself would not ordinarily be heard by those on the receiving vessel, for the reasons already mentioned. This method of audible signaling is intended to supplement the longer range of wireless telegraphy, and to fill the gap which the present wireless system leaves open, to wit, the inability to detect the direction from which the wireless waves come.

It has heretofore been demonstrated that a vessel in distress, equipped with a wireless telegraph, is able to communicate to other vessels similarly equipped, its longitude and latitude, yet these succoring vessels have found it practically impossible to more than find the approximate position of the vessel calling for aid, notwithstanding they were in constant wireless communication, and that precious hours have been lost, as in the case of the steamship "*Republic*," in scouting about the vicinity before the succoring vessels were able to find the exact position of the vessel in distress in the thick weather that prevailed.

One of the purposes of my invention is to establish wireless communication by sound waves of such a character and by means of such apparatus that the two vessels will be in a position to determine automatically, by the use of my invention, the exact position of each relative to the other. Consequently, if the distressed vessel sends out its siren signals into space, these will be directly detected and localized by a succoring vessel arriving within the zone of audible communication, so that it can steer directly for the vessel requiring aid and thereby be able to reach it in ample time not only to rescue the passengers but to save the vessel as well. There will be no further need for the distressed ship, with this system in use, to transmit its longitude and latitude.

It is a matter of common knowledge that certain sounds, such as produced by artillery, have been perceptibly heard by the ordinary ear at distances of forty miles and more and there are cases on record where this distance has been greatly exceeded under favorable wind conditions. By means of my apparatus I believe it will be possible to detect the sound of a steam or air siren at even greater distances. Thus, two vessels may be able to "speak" to each other when one of them is so distant as to be barely visible above the horizon, and at a distance where the sound would not directly affect the ear but would be strong enough to actuate the microphonic detectors.

Another purpose of my invention is to produce not only visible records of the sound waves or signals, but also to provide means for permanently recording the same, so that a record may be kept of all messages received and transmitted. Furthermore, when my invention is used for "speaking" or aerial telegraphic communicating purposes between vessels or between a vessel and a shore station, for which it is my purpose to employ it on clear days or at other times when my appliances are not required as a safeguard for the prevention of collisions, grounding, etc., in fog or thick weather, I may arrange or adjust my transmitting and my indicating or recording apparatus so as to transmit and receive, respectively, for such intercommunicating purposes, atmospheric wave signals of an inaudible character. That is to say, I employ atmospheric waves of such frequencies or pitches as are below or above the ordinary limits of acoustic audibility, so that such communications may be carried on not only without disturbing passengers but in a manner that will insure privacy and secrecy of the aerial or wireless-atmospheric messages.

Various other features of my invention will be more specifically referred to and described in the specification to follow, with reference to the figures of the drawings illustrating the same.

In the accompanying drawings Figure 1 is a general side elevation of a steamship equipped with apparatus for practising my invention.

Fig. 2 is a general plan of the same.

Fig. 3 is a diagram of the electrical circuits of the apparatus indicated in Fig. 1 upon the ship.

Fig. 4 shows in plan a preferred construction of apparatus in which provision is made for extending or retracting the arms which carry the sound receiving or gathering devices.

Fig. 5 shows a vertical section of a mast and the attachments for supporting and operating the swinging arm carrying the sound gathering or collecting receivers mounted at or near the extremities thereof.

Fig. 6 is a diagram of a modified arrangement of circuits and apparatus by means of which the observer may ascertain by the silence of the telephone receivers the fact that the sound receivers are focused upon the source of sound.

Fig. 7 is a plan of a visual indicator for enabling the observer to ascertain the relative strength of the sound affecting the sound receivers and so as to enable him to know when they are focused.

Fig. 8 is a side elevation and partial section of another form of visual indicator employed for the same purpose.

Fig. 9 shows a plan and means for recording the operations of the sound receiving apparatus by the lookout or observer.

Fig. 10 is a diagram of the circuits of the supplemental fore and aft arrangement shown in Figs. 1, 2 and 3, with additional sound receiving devices to intensify the collected sound.

Fig. 11 illustrates diagrammatically the modification of the additional sound receiving devices at or near the ends of the base lines respectively and one method of connecting the same to increase the sound gathering power of the apparatus.

Fig. 12 shows an improved type of siren that may be employed in practising my invention.

Fig. 13 shows a telegraph register and wireless transmitter key connected up for use in the manner hereinafter described.

Fig. 14 shows partly in diagram an electrical apparatus used in carrying out my invention and adapted to intermittently operate a sound producing apparatus such as a siren.

Fig. 15 is a plan of my acoustic range-finding apparatus illustrated in Figs. 1, 2 and 3, showing the details of the focusing and range indicating devices, and also showing the location thereon of the centrally mounted horn or siren employed by me when the apparatus is used for the detection and location of icebergs and other obstructions by means of echoes.

Fig. 16 is a plan of a portable apparatus for a headpiece or helmet for fitting the observer's head.

Fig. 17 is a pictorial illustration of the use of my invention on vessels at sea for some of the purposes hereinbefore mentioned and is self-evident.

Fig. 18 illustrates the use of my invention in enabling a ferry-boat to reach its slip in a fog and is self-evident.

Fig. 19 is a diagram illustrating diagrammatically the action of my apparatus when engaged by sound waves.

Fig. 20 shows a modified construction of a sound receiving device in which a microphone transmitter is employed in the focus of a concave sound reflector.

Fig. 21 shows a form of direction finding apparatus by my invention and adapted for use on sailing and other vessels on which more elaborate devices are not required.

Fig. 22 shows a modified form of sound transmitting apparatus embodying an air siren and trumpet.

Referring particularly to Figs. 1, 2 and 3, the sound collecting or concentric funnels of the sound receivers are indicated at 1, these funnels being similar to those of a megaphone and properly designed to collect and concentrate the air waves accompanying the sound.

2 indicates the diaphragm and contacts of an electrical instrument sensitive to sound waves and combined with each sound collecting funnel to receive and transmit the collected sound. Conveniently, this electrical transmitter may consists of an ordinary microphone or telephone transmitter located in the neck of the funnel or in any tubular extension thereof into which the sounds are conveyed after collection and concentration. If desired, each electrical transmitter may have its impulses relayed through an induction coil 3, as indicated, through the electrical receiving instrument or instruments employed.

In this preferred form of my invention it will be seen that the telephone transmitter is a component part of the sound receiver.

Diagram Figs. 2 and 3 show additional sound receivers arranged in pairs, one pair on each side of the ship, the members of the pair being respectively located as far apart as may be convenient on the side. Two more pairs are also shown located on the ends of the yarn arm 4 mounted on the lookout mast 5 or this arm may be otherwise conveniently located on a special post or support erected preferably at the bow of the vessel. The yard arm is capable of revolution around the mast as a center to direct the mouths of the receivers 1 in any desired direction, at the same time changing the position of the base line connecting them and of a suitable pointer or indicator responsive to the turning movement of the base line. Two pairs are shown on this arm, one having its receiver mouth directly ahead and the other directly astern for convenience of operation. Still another pair of sound receivers has its members located respectively at the extreme fore mouth and stern, as shown, thus giving the maximum base line and the maximum sensitiveness under the condition of use when the ship itself is used for the turning support for the pair of sound receivers.

6 indicates a pair of head telephones for use by the lookout in detecting or observing the sounds received by the receivers on the yard arm, and 6' 6' indicates a similar pair for use by the navigating officer on the bridge of the ship.

The several electrical circuits of the transmitter devices, may for convenience, terminate as shown in Fig. 3 in spring jacks, so that by the use of the spring jack plugs 7 the head telephones 6' or other receiving instrument may be connected at will to any pair of sound receivers 1.

The manner of mounting the arm or arms and of turning said arm or arms with its or their connected pair of sound receivers, when used by the lookout on a ship, is shown more particularly in Figs. 4, 5 and 15. The center of the yard arm as shown in Figs. 4 and 5 comprises a collar 8 which encircles the mast 9 and turns upon roller bearings, as indicated in Fig. 5. The inside of the sleeve or collar is furnished with a suitable rack for operation by the pinion 10 upon shaft 11, which extends downward through the mast 9 and which may be turned either from the deck, the bridge or from the position of the lookout. Fig. 15 shows the means preferably employed by me for simultaneously focusing the sound receivers upon the distant sound source and ascertaining its distance from the point of observation immediately after its direction has been obtained by turning the arm.

The mechanism for operation by the lookout consists of a crank shaft 12 connected by a belt 13 or otherwise to the shaft 11. If desired to operate the shaft 11 from another point, a second belt 13' may be belted thereto and operated in any suitable manner.

15 is the crank arm operated by the lookout and 16 is a pointer fixed to the hub or sleeve 8 and which will point directly to the source of sound and indicate its exact direction when the apparatus is employed in the manner previously set forth. A supplemental pointer 16' on the crank shaft may be used for the same purpose. If desired, the yard arm may have extensible end portions 4' as shown in Fig. 4, upon the extremities of which the sound receivers are mounted. These end portions are provided with a rack 17 operable by gear wheel 18 and belt 19 from the crow's nest, by the lookout, or other person therein, so that the length of the base line connecting either of the two pairs of receivers on said yard arm may be extended at will to give greater sensitiveness, if required.

The cable or connection from the electrical transmitters in the sound receivers is indicated at 20 and is carried through the hollow arms to the head telephones 6 for the lookout, or other sensitive electrical receiving instrument employed by him.

It will be understood, however, that the invention does not require the use of electrical receiving instruments by the lookout or other person since, as indicated in Fig. 21, the sound receivers 1 may have their trumpets connected by small tubing 21 with ear-pieces 22 for transmitting the received and concentrated sound waves directly to the ear of the operator. This more simple form of my invention may advantageously be used by sailing vessels and small power boats.

The extreme pair of receivers 1 shown in Fig. 3 are electrically capable of being revolved in unison by any suitable step by step escapement apparatus, typified at 23, the rotating handle of which apparatus is typified at 24. Provision is also preferably made for securing a permanent record of the sounds received or transmitted from the funnels or devices 1, when this is desirable, or when they are used as receivers or transmitters of code signals. Such telegraph registering or recording instruments are merely indicated in outline at 25, Fig. 3, and are shown connected to the electrical circuits of the instruments 1. These telegraph registering and recording instruments or other apparatus may be of the form or construction described later on in this specification or of any other desired form.

In the modified electrical receiving instrument shown in Fig. 6 for permitting the intensity of the sound received to be observed, provision is made for showing by the absence of sound or action, that the arm or support carrying the sound receivers 1 is turned with its base line in position to place both receivers in position to receive the sounds with equal effect or intensity. This will occur when the oncoming crest of any given concentric wave front (or of a successions of such waves,) impinges simultaneously against the mouths of both sound receivers, or upon the diaphragms at the base thereof. In this arrangement, instead of using two separate head phones or other instruments, I use a single electrical receiving instrument, such for instance as a telephone receiver. In this case the core 25 of the telephone magnet is provided with two oppositely acting coils 26 connected respectively to the circuits of the electrical transmitters, as shown.

When the arm constituting the base line is so swung as to cause one megaphone or sound receiver to be in advance of the other with respect to any particular wave front, so as to produce a more intense sound in one receiver than in the other, a sound will be heard in the receiver, since the action of one coil will then be stronger than the other. As soon as the swinging arm is brought into proper position with respect to the concentric wave front, the same wave will impinge simultaneously upon both receivers and thus equalize the sound in both megaphone receivers and neutralize the sound in the head telephone receiver. This neutralization or elimination of sound will indicate that the two megaphone receivers are radially at the same distance from the source of sound, and that the index finger attached to the center of the swinging base is pointing directly toward the source of sound. This appliance overcomes any errors due to defective hearing or differences in sensitiveness of the two ears of the lookout or other person using the apparatus. It will be noted that both these microphonic sound-gathering and transmitting instruments are connected with a battery common to both instruments, and that the electrical resistance of both branches of the circuit are so arranged as to be accurately balanced. An artificial resistance 26', in each of the secondary branches, permits of a more exact calibration and adjustment of the apparatus.

On momentarily opening the circuit of either one of the coils 26, 26, when the sound has been neutralized, as by pressing upon a push button switch provided for that purpose, or by temporarily breaking the connection at one of the contact points 26', the observer can instantly ascertain whether or not the apparatus is still focused upon the source of sound and therefore whether the silence is due to balancement or to the actual cessation of the distant sound. If the former, the telephone 25 will immediately respond to the full unopposed action of the other coil and proclaim the fact. Again, should the course of the vessel veer from the direct line of sound transmission, this fact will also be audibly indicated by a gradually increased loudness of the sound in the head-phone, which will continue until the focus is again restored, as by turning the yard-arm back to face the direction of the sound. When the direction of a given sound is once located and known by the navigator, the yard-arm may be turned in other directions just as is done in using an ordinary searchlight, so as to enable him to steer clear of other unseen vessels and obstructions in case of thick weather, and to communicate with other ships or stations during clear weather, or when the apparatus is not being employed for protection against collisions, etc. The same arrangement can be applied to the double head-telephone type of instruments shown in Figs. 4 and 11, as well as to those of the automatic recording types, if desired.

Another and comparatively simple and novel method of using my swinging arm form of sound locating apparatus, when exploring for, say, any direct source of sound, may be effectively employed by me either with the purely acoustic or the telephone types of my apparatus. This method enables me advantageously to obtain a fairly close indication as to direction by making use in connection with my apparatus, of the well known acoustic phenomenon known as "Doppler's principle". By constructing my centrally pivoted swinging base of light, tubular arms of considerable length, say of the telescopic construction shown in Figs. 2 and 4, mounted upon anti-friction bearings as illustrated in Fig. 5 and operated by crank 15 and chain 13 or equivalent means, a rapid turning motion over a considerable arc may be imparted in alternately reverse directions to the sound receiving horns 1, 1, at the port and starboard sides of the arm 4, respectively.

Let us now assume that the arm is turned with the receivers facing the general direction of a distant sound, but without stopping to use the focusing means already described by me for obtaining a fine adjustment to indicate both distance and direction; and that this coarse adjustment may develop a possible unascertainable radial difference from the true source, amounting say to a few wave lengths between the mouths of the two receivers, with respect to the actual wave front. Under these conditions, to obtain the proper direction, all that is necessary is to swing or rock the arm alternately about to the right and left, with a fairly rapid movement, while the ear tubes or head-phones are in use. It will now be found that the pitch of the sound impinging upon the advancing receiver will rise, while that registered by the retreating receiver will fall. On each reverse movement, a point will be be reached at which the pitch in both receivers has the same value. This is the "neutral point", and by observing the position of the index 16 as it passes this point on the scale, the exact direction of the distant whistle, bell or other sounding body is immediately and directly indicated, and the vessel may then at once be steered accordingly. The direction having thus been ascertained, the distance in miles and fractions may then be found, if this information be also desired, by moving the handle 54 over the scale 52, as described with reference to Fig. 15. It will be understood that in this operation of my invention, the direction of a distant sound-emitting object, whether such sound be direct or be reflected therefrom in the form of an echo, is ascertained by the balancement of the pitch instead of by the intensity of the received sound, and can thus be very readily distinguished even if one ear be less sensitive than the other.

Fig. 7 shows a visual indicator in which coils 27 replace the coils of the two telephone instruments of the head telephone respectively. These coils act upon the cores 28 carried by a swinging arm pivoted at 29 and provided with a sector 30, which gears with a pinion 31 on a shaft carrying the pointer 32. The coils 27 are connected respectively into the primary battery circuits of the two sound receivers, and when the action upon said receivers is equal, thus indicating that the sound receivers are presented to the source of sound with their base line perpendicular to the direction of the sound, it is obvious that the pointer would stand in the central or neutral position.

The presence of an instrument such as shown in Fig. 7 is indicated in the diagram Fig. 3, where it is used as an adjunct to the head telephone of the navigating or other supervising officer who has it in his power to check the observation of the lookout or to make observations directly himself by employing the supplementary or auxiliary pairs of sound receivers on the sides or ends of the ship and swinging the ship, as already explained.

Fig. 8 illustrates another visual indicator in which I employ two sensitive flames 33 placed within an inclosed transparent chamber 34 provided with a central partition 35 and suitable ventilating holes. The respective telephones 36 are connected with the combined megaphone receivers and transmitters, so that the varying amplitudes of vibration of their respective diaphragms are rendered visible by the action of the air currents upon the sensitive flames. This apparatus may be used on the bridge and serves as a check upon the manipulation of the swinging arm by the lookout stationed in the crow's nest.

Fig. 9 shows another type of records also intended to check and record operations of the lookout. This consists of a moving record band 37 upon which bear two recording pens or styli, one being operated by coils 27 like the coils of the instrument Fig. 7, to indicate any fluctuations in the true angle of the movable cross-arm or base, and the other indicating the corresponding deviations produced by the compass in steering the vessel. By this apparatus the true conditions affecting the record may be simultaneously compared.

Fig. 11 is a diagram indicating additional megaphones mounted on each support, by which more of the sound waves, or rather a greater portion of each separate sound wave or wave front is gathered, thereby producing greater intensification of collected sound. The megaphone transmitters are shown connected in multiple so as to impress their combined strength on the head phones.

Fig. 12 shows an improved type of siren for transmitting signals to be received upon similar apparatus upon another ship or for producing sounds which, being reflected back from an object, may be employed in connection with the apparatus described for locating the position of that object as a source of sound. In this device, which is preferably mounted above the crow's nest, as indicated in Fig. 1, the siren 39 is inclosed within a large closed receiver in the form of a completely inclosed bell 40, provided with a wide flaring mouth. This form of my siren may likewise be mounted upon the yard-arm midway between my sound receivers, by providing a suitable swiveled or flexible connection between it and its supply pipe.

It is well known that the intensity of a sound emitted by a sonorous body depends upon the density of the atmosphere in which the sound is generated, and I have utilized this principle for the purpose of further projecting the sound than it would travel if produced in free air. When the vessel is moving forward at a high rate of speed, this chamber or bell will be filled with air at a higher pressure and therefore under a greater density than that of the surrounding atmosphere. Consequently, when the siren is operated, the waves will be produced in a comparatively dense atmosphere, which by virtue of the flaring mouth of the bell will be communicated to the external atmosphere by the forcible vibrations within the bell, which are somewhat tempered by the said flaring mouth, so as to avoid too sharp a line of demarcation between the layers of air within and without the bell.

By increasing the pitch of the siren, deflection of the sound waves by refracting mists will be prevented, as these rapid sound waves have a tendency to go direct to the mark and are not readily deflected from their course. On the other hand, for long-distance signaling and intercommunication purposes, where the curvature of the earth would otherwise interpose an obstacle, say for distances above fifty miles, a lower pitch or frequency of the siren would be employed. In this case the sound waves would follow the curvature of the earth for great distances, as these low-pitched waves are more readily deflected. It is this principle that restricts the extremely high frequency light waves to straight line propagation, while permitting the relatively lower frequency Hertzian wireless waves to bend around the earth and cover such enormous distances as they do.

In this connection it should be pointed out that both light waves and Hertzian waves are alike propagated from their source in straight radial lines. A telescope must, therefore, be pointed directly at an invisible object in order that it may be magnified and perceived by the eye, and only the direct rays passing from the object through the optical center of the instrument are visible. In the wireless telegraph, only such of the waves radiated out into space as reach the antenna of the receiving ship, and which may represent but an exceedingly minute fraction of the total original energy sent out, are usefully available, and additional local energy must be applied to make them manifest. On the other hand, the sound waves I employ have the advantage of traveling from their point of origin through the atmosphere or other media in ever widening spherical or concentric circles or arcs of such circles, according to the extent, character and form of the media in which the sound is produced. Moreover, instead of necessarily projecting the sound in all directions and thereby needlessly dissipating its energy, I am enabled, whenever desirable, initially to restrict its direction of propagation, at its point of origin, by reflection, as by means of a special sound "deflector" such as I have shown at 40 in Fig. 12. By means of a reflector of this type, curved in the required manner, the entire volume of sound generated by the siren 39, mounted at the center of the yard-arm, can be projected in any given direction and over a zone of the desired radial angle, say 60 to 120 degrees, which would be amply wide enough to affect the sound receivers on all near and remote vessels in its general path, without even the need for swinging the yard-arm to cover a wider scope. In employing a deflecting reflector of this type, the best results are obtained, particularly when short wave lengths are employed, to mount the siren 39 on telescopic sleeve as shown, which can be adjusted so that the focal distance between the mouth of the siren and the rear of the reflector 40 will be approximately one-half the wave length, in order that the crests of the reflected portion of the waves and those of the projected waves will cumulatively coincide. For the average waves of lower pitch and of comparatively long length, this adjustment may generally be dispensed with, provided the distance between the mouth of the siren and the reflecting surface be short.

When my apparatus is employed for long-distance signaling and intercommunicating purposes as just mentioned, I preferably make use of low frequency "inaudible" atmospheric waves or pulses following each other at an approximate speed of from about 12 to 24 vibrations per second, which may be produced either by a separate siren or instrument or by speeding down the regular siren. In practice, the siren or the sound projecting horn communicating therewith is preferably mounted directly on the yard-arm, 4, and arranged to turn therewith, as more particularly shown in Fig. 15. In this manner the atmospheric waves, by simply turning the arm 4, may conveniently be projected in any desired direction, as toward another vessel, and so that the inaudible answering signals or atmospheric-wave messages will impinge directly upon the receiving instruments 1, 1, at the extremities of the arm 4, which are thus in proper position to receive these answering signals or messages and to at once transmit the same to the recording instruments shown in Fig. 3, or to visual indicating instruments such as shown in Fig. 8, from which they may be read.

These wireless atmospheric-wave messages have the advantage that they are not subject to interference by other atmospheric-wave messages coming from different directions for the reason that my receivers 1, 1 are focused upon the vessel or shore station with which it is in communication at the time, and will therefore respond only to messages coming therefrom. Should another vessel at a distance behind the answering vessel be in a direct line with and at the same time also point its movable base-line 4 containing the transmitting horn 40 and the widely separated receivers 1, 1, directly toward the two vessels in communication, and should this third vessel also endeavor to communicate with the receiving vessel (this being the only condition under which interference could take place,) there would still be little or no interference likely, since the more distant signals, because of the greater distance traversed by them, would be so much weaker by comparison with the nearer signals, that the recording instruments would respond far more strongly to the latter.

Another advantage that my wireless atmospheric-wave system of communication possesses over the ordinary Hertzian wireless telegraph, for distances within its practicable range, whether the atmospheric waves be of audible or inaudible frequency; is that any number of messages may be transmitted and received through the atmosphere at the same time between any number of vessels and in practically all directions regardless of particular wave lengths or the necessity for attunement of the receiving apparatus to that of the transmitting station, so that any vessel within range may at all times selectively communicate with any other disengaged vessel without waiting for the cessation of communications between other vessels. An acoustically disengaged vessel will ordinarily explore the atmosphere for chance signals either by swinging the yard arm about or by means of the automatic apparatus which I have illustrated in Fig. 20 and which may be permanently connected with any suitable recording instrument under the observation of an officer on the bridge or other person. Consequently, should a call for the ship or a distress signal appear, the yard arm would immediately be moved into position to place itself in communication with the station or vessel originating the call.

When my sound-collecting and magnifying receivers 1, 1, at the extremities of my centrally-pivoted base-line 4, 4, are not in actual use or not focused upon any particular point, their mouths are separated to embrace a much wider angle or arc, so as to be impinged upon by any waves coming from other directions. Because of the wide spherical wave fronts presented by sound vibrations in the atmosphere, such waves will then enter and be instantly discovered through one or the other or both of my wide-mouthed receivers, in whatever position the base-line itself may be, and this without necessarily swinging the yard-arm, provided the rearwardly projecting receivers thereon shown in Fig. 2 are cut into circuit to receive possible calls originating aft of the vessel. Should the source of a freshly discovered sound be located as coming from a point at either side of the ship, either the central fore and aft or the "broadside groups" of receivers, on vessels so equipped, may be employed to "listen in", leaving the yard-arm or "finding" instruments free to explore other regions. It will be observed that, unlike light waves, which, as has been mentioned, must pass directly through the optical center of the telescope in order to become visible, the sound waves need not, in exploring, enter directly through the center of my sound-gathering funnels, since they may impinge at an angle and by reflection from wall to wall within the same will fall upon and affect the diaphragm or diaphragms of the micro-phones or of the ears.

One of the four registers shown in Fig. 3 is intended to receive and record incoming wireless messages, whether the same be of the inaudible atmospheric wave type already described, or of the usual Hertzian wave type employed in ordinary wireless work. In the latter case, the register is cut into the coherer or detector circuit when the wireless operator leaves his post of duty for the night, and also whenever distress or emergency business is being received. S. O. S. signals may be recorded on the tape in the operator's absence. A sensitive relay bridged across the operator's head phone circuit will control a local circuit operating the register, in such a way that the latter will convert the humming code signals into regular dot and dash signals on the tape. Should such signals appear, the officer on the bridge noting same will immediately arouse and call the wireless operator to his post, thus saving the expense of maintaining two operators on board of every vessel, as is being recommended. A record of all purely ship messages as distinguished from commercial can also be kept on same register, by the operator cutting same into circuit.

Fig. 13 shows a telegraphic register 41 connected with the wireless transmission key 43, which is provided with auxiliary contacts 43' and 43" and a local battery and switch 42 for operating the register whenever messages are being sent by the wireless operator, provided the switch shown is closed. A similar apparatus is used for receiving and recording wireless messages by including the register in a branch receiver circuit through an intervening relay. Whenever the operator turns in for the night or leaves his post of duty, the register being located on the bridge will indicate to the officer any distress signals that may be set up and which affect the wireless outfit of the vessel.

Fig. 14 shows a break-wheel device 49 for electrically operating a steam or compressed air siren and a register 50 for recording if desired the signals transmitted by said siren, when the switch (not shown) of key 44 is closed. An auxiliary Morse key 44 is included in a branch circuit, by means of which when the break-wheel switch 45 is open, code or Morse communication may be established with the distant vessel through the siren and such messages likewise recorded by the register.

The valve which controls the flow of air or steam to the siren is indicated at 46. The siren proper is shown at 47, while 48 is an electro-magnet for operating the valve. This magnet is connected, as shown, to the circuit breaker wheel 49, which intermittently causes the siren to sound at stated intervals, depending upon the speed of the wheel, by closing the circuit of the electro-magnet 48 and opening the valve, which latter would of course be of the self-closing type.

As shown in Fig. 15, which indicates more clearly and on an enlarged scale the construction of the forward pivoted supporting arm and associated appliances shown in Fig. 1, the pair of sound receivers 1 may be mounted to turn independently upon the arm or support which constitutes the base line and which swings on the center 51. By making the receivers 1 capable of turning on their support or with relation to their common base line, they may be made to focus or converge upon the source of sound and by means of the indicating instruments described, the fact that they do converge or focus thereon would be indicated by the clearness, uniformity and intensity of the received sound. When so directed or focused, the angle between their axes and the base line will correspond to the two angles at the extremities of the base of an isosceles triangle, of which the source of sound will constitute the apex. By triangulation the distance of the apex or, in other words, the length of the line described from the source as a perpendicular to the base may be known. If desired, the angle referred to may be read directly from a protractor scale 52 over which rides a pointer 53 carried by an arm 54 which, through rods 55, serves to turn the instruments 1 on their pivots to converge or focus them upon the distant source of sound. It will be more convenient, however, and in practice I prefer to graduate or calibrate the scale 52 to read directly in lengths of the perpendicular line representing the distance of the object, in terms of kilometers or miles and subdivisions or fractions thereof, so that the exact distance of the source of sound from the ship can immediately be read off from the figures on the scale 52 as indicated by the pointer 53. These distances may be readily calculated for any given length of my pivoted base-line, in advance by mathematical processes used in triangulation, and which need not therefore be recited in detail in this specification.

It will be obvious that the principle of the apparatus illustrated in Fig. 15 may be embodied in other structures, the essence of this part of my invention lying in a construction wherein the sound receivers are mounted upon an arm or support, which constitutes practically a base line of a triangle, while the instruments themselves are independently mounted on said support, so as to be capable of being turned and directed toward the distant source of sound or placed at different angles to the base line.

For more accurately focusing this type of my apparatus, the instruments are preferably given an elongated form, as, for example, in Figs. 21 or 22, so as to have a relatively long axial line. When such a pair of instruments are inclined toward a source from which waves emanate, such waves will enter without obstruction, whereas if the inclination is slightly displaced, that is to say, if the axis is not in line with the source, only a portion or none of the waves that strike against the apparatus will enter the apertures, and will thus not become effective until the two radii are made to coincide with the source or center of said waves.

Fig. 16 is a plan view of a portable acoustic apparatus carried by the head and used for sound exploring purposes either on shipboard or on land. The two devices 1 are connected by flexible tubing 56 with the ear-pieces 57 and are hinged at 58 on the frame 59 in such manner that their mouths may be approached at a greater or less angle so as to direct their mouths to the apex or source of sound, this being done by moving the two arms by means of the hands. In the use of this apparatus, the head or the body of the user serves as its pivotal or swinging support.

60 indicates a helmet which may be worn by the observer and in which the ear-pieces 57 are mounted. The sound-gathering devices 1 connecting with the ear-pieces through tubing 62, as shown, constitute supporting arms for the sound-gathering or megaphone funnels 1. An ordinary shrill whistle, or a megaphone, or the two combined in one instrument, may be employed by the user of this simple form of my invention, for the purpose of signaling to or communicating with other users of this apparatus at very considerable distances. This device may be effectively used by scouting, exploring and surveying parties and for many other purposes that will suggest themselves.

In the case of any of the forms of my invention where the distance separating the two receivers is short, it may be desirable to use a separating shield fixed to the center about which the devices turn and projected toward the distant object or source of sound to be observed, said shield serving the purpose of assisting in the differentiation of the sounds collected by the two receivers by preventing the waves or vibrations which act upon one receiver from acting upon the other or upon the devices by which the collected sounds of the latter are indicated or observed. Said device acts in one sense to split the sound vibrations or waves and to individualize one portion in one receiver and the other in the other receiver and to make the effect upon them equal when the shield or diaphragm is pointed directly toward the source of sound. Any deviation thereof from the true direction of the sound will obviously cause it to shield one receiver and permit the waves to act more fully upon the other. Such a separating shield is shown at 75, Fig. 16. Obviously such shield may serve likewise as a pointer.

Referring to the self-explanatory Fig. 17, it may be further stated that a sound-reflecting board of great extent, as indicated at 63, may be mounted upon a tower or standard on the land or at other danger points to provide the echo for the sound of the siren produced on shipboard. The siren horn of a lighthouse in this figure is indicated at 64.

Fig. 22 shows an air siren as mounted in the inner end of an elongated horn 64, which may be used as a modified type of transmitting trumpet.

This trumpet may be swiveled in a manner similar to a searchlight, so that the sound produced thereby may be projected in any given or desired direction, whereby it may more readily and accurately be reflected back to the vessel and be received by my sound-receiving finding-apparatus. By this arrangement, the sound can be projected, in the same manner as with my combined apparatus already described, against any particular part of the exposed surface of an iceberg or other object, so that the angle of incidence as well as the angle of reflection of the sound, or echo, will lie in the same horizontal line. If the siren 40 or 64 is mounted upon the yard arm at a point midway between my two sound receivers, so as to be movable therewith, as I have shown in Fig. 15, the echo of the sound thus projected will be observed and heard directly through the medium of these receiving megaphones, without further movement of exploration, and the position of the berg or other obstruction will be immediately detected and located.

In the modification of sound receiver shown in Fig. 20, the sounds are received upon the concave sound-reflecting surface 65 and are collected and directed by the latter into the mouth of the telephone or other electrical transmitter located at the focus of said sound-reflecting board 65. Provision for turning or directing said reflector toward the source of sound comprises, as is shown, a driven wheel 66 adapted to be geared at will to a wheel 67, with a wheel 68 carried by the base upon which the reflector and electrical transmitter are mounted. To provide the continuous connection from the transmitter to the receiving or recording instruments, suitable connecting rings mounted on the base and forming the terminals of the transmitter may be used. Fixed collector brushes 69 bear on these rings and serve for attachment of the wires leading to the telephone receivers. As hereinbefore stated, I may also use, in lieu of or in addition to the telephone transmitter, any suitable type of recording instrument, such as a telegraphone, phonograph or other apparatus adapted to produce a permanent characteristic wave record of the received sounds or of inaudible waves, signals and impulses of a secret nature, and showing their relative strengths and exact position with reference to the points of the compass whence they originated, as well as the time when they were received and recorded. I do not, however, desire to specifically claim these sound and other impulse recording instruments herein, as it is distinctly understood that these and all other features of my invention shown and described but not generically and specifically claimed in this application, are hereby expressly reserved by me and will be made the subject-matter for divisional or supplemental applications for United States Letters Patent to be hereafter filed.

This reflector with its focusing transmitter may either be revolved in a complete circle, or it may be arranged so as to be oscillated within an arc of any desired length or angle for sound exploring and detecting purposes. In the latter case, a pair of flexible wires may be substituted for the collector rings and brushes.

Fig. 19 is a digram illustrating diagrammatically the action of my apparatus when impressed by sound waves. If a sound originates at 0, it will, as is well known, spread in the form of spherical waves, in concentric circles. If, at a distance of 2000 feet, the sound has an intensity of 1/4 of its full value which we will call 1 at distance 0, it will have at 3000 feet an intensity of 1/9, at 4000 feet an intensity of 1/16, and at 5000 feet an intensity of 1/25 of its original value, the intensity at any given point varying inversely as the square of the distance. As sound travels through the atmosphere at 1130 feet per second under normal temperature conditions and if the siren be adjusted so as to give 1130 vibrations per second, then each wave will have a length of just one foot. If the pitch of the siren be increased to 2260 vibrations, the wave lengths would be six inches apart. Therefore, a vessel approaching with its megaphones inclined to the wave front, as shown at the right of the figure, the right and left-hand megaphones would be impinged upon, not by the same wave, but by two different waves separated by a number of intermediate waves apart. This would cause an inharmonious condition and a difference in intensity in the sounds received by the two megaphones respectively. If the vessel advances toward the left and the arm is placed in a position so that its megaphones will be impinged upon by the same concentric wave, the two megaphones will be uniformly acted upon and the sounds in the receivers connected therewith will be in substantially perfect attunement or unison and of equal strength, indicating that the direction of the source of the sound is at a point located directly in a line projected from a point on the arm midway between the two megaphones. The wide angular displacement between the two arms may be compared with a distance separating a pair of ears indicated at $x, x$, and the parallax will thus be seen to be considerably greater as is also the sound-gathering power, since a larger portion of the wave front is effectively utilized.

The operation of the arrangement of the optional supplementary devices shown in Fig. 10 will be understood when it is considered that sound travels through the atmosphere at the rate of 1130 feet per second. An electric current will cover this distance instantaneously, its speed being 185,000 miles per second. Now, if two microphones, 75 and 75', be mounted on the deck of a vessel at a distance 565 feet apart, a series of sound waves approaching them in the direction of arrow X, will act upon 75 just half a second before reaching 75'. The respective impulses are instantly transmitted to the head telephone 6' 6', so that the interval between the two sets of vibrations may be simultaneously heard and the overlapping or interference value noted. If the sound is produced by a siren emitting say 1200 vibrations per second, there will be a difference of 600 waves between 75 and 75'. By adjusting the frame of 75' back or forth in its support a short distance, a series of "beats" may be obtained and heard in the head telephone or telephones.

As the strength of the propagated sound through free air varies inversely as the square of the distance from its source, the above apparatus affords an independent though perhaps not as effective a means of determining the distance of the source from the vessel, the direction of the source having been previously ascertained by swinging the arms carrying the megaphones 1 about their axes.

For example, taking the length of 565 feet as a unit length, and a siren on another vessel 50 lengths distant, or approximately 6 miles away, as giving a sound of unit intensity or strength. Under the law of inverse squares, the intensity of the sound received by 75 at 50 lengths distant would be $\frac{1}{2500}$; at 40 lengths $\frac{1}{1600}$; at 20 lengths $\frac{1}{400}$; at 10 lengths $\frac{1}{100}$; at 4 lengths $\frac{1}{16}$. Now, if 75 is distant 20 lengths, then 75' will be 21 lengths away. The relative intensities will be $\frac{1}{400} : \frac{1}{439}$. If 75 be 10 and 75' be 11 lengths, the relative intensities will be $\frac{1}{100} : \frac{1}{121}$. If 75 = 50 and 75' = 51, the ratios would be $\frac{1}{2500} : \frac{1}{2561}$. Thus, the difference in strength between 6' 6' is an indication of the distance separating one vessel from the source of sound on another vessel, or from some land station, etc. A sensitive flame may be used as a detector.

The sensitiveness or sound-gathering power of my sound receiving and detecting apparatus at varying distances from the source of sound, as compared with that of the unaided human ear, may be understood from the following example.

Let us assume that the area of the exposed portion of the average human ear is two and one-half square inches, or a total of five square inches for both ears, (as represented at XX of Fig. 19) and that the whole of this surface is available for gathering vibrations representing that part of a wave front of equal area, and conveying same into the auditory canal so as to impinge upon the diaphragm or ear drums. As a matter of fact, only a small fraction of the wave front area that impinges upon the external ear is actually conducted into the auditory canal, so that the above assumption is purposely made a very liberal one in favor of the natural ear. Again, let us assume that the distance separating the two ears is eight inches, which will therefore give us a parallax, when focused upon a source of sound at any distance, having a baseline but eight inches in length.

We will now assume that the two sound receivers mounted upon the respective extremities of the movable cross-arm, are normally 80 feet, or 720 inches apart with the telescope extension arms closed, and when the arms are extended, have a spread of 140 feet, or 1680 inches, and that each sound receiver has a bell or funnel opening measuring 30 inches in diameter. This would give an area of 4.91 square feet, or 897 square inches for each of the two megaphones, or a total of 9.82 square feet, or 1394 square inches of aperture exposed to the wave front, through which the sound waves directly enter. It will be apparent that the two megaphone sound receivers would thus have an effective area 279 times as great as the entire surface of the ears, and a base line variable from 120 to 210 times as long as the base line or distance separating the two ears.

Now, if at a distance of one mile from a source of sound, such as produced by a siren, the sound is perceived with a given intensity by the ears, then at five miles the sound waves will affect the ears with only one-twenty-fifth of this intensity. However, since the sound-gathering area of the megaphone transmitters is 279 times greater than that of the ears, the intensity or volume of the sound will be more than seven times greater with this device at five miles, than it was at one mile without it. Consequently, applying the same law of inverse squares, a sound that is almost inaudible to the ears at a distance of one mile from its source, can be clearly heard at a distance of fifteen miles or more by the use of the apparatus. In the same manner, sound vibrations which are barely capable of being heard by the naked ear at two miles from the source, should be readily and clearly distinguished by this particular size of receiving apparatus at a distance of thirty miles from their source. The same proportion between intensity and distance of perception will hold true for any other given intensity of sound, and as it is well known that the sound of a siren can be heard by the naked ear under favorable conditions for a distance of several miles, such sounds, say in the form of code signals or telegraphic messages, can be clearly detected by my apparatus at very much greater distances than those above mentioned.

Again, I am enabled materially to reinforce the volume of sound received, should a still greater degree of sensitiveness be required. My conical-shaped megaphone receivers with their large-mouthed opening for collecting the sound waves may be likened to a telescope having an objective lens of large diameter, and consequently of great light-gathering capacity. There is, however, a limit beyond which I find it either inadvisable or impracticable to increase the diameter of the bell, just as it is impracticable to unduly enlarge the size of an objective lens. In the case of sound waves, however, I have nevertheless the advantage of being able to increase the sound-gathering power, or the amounts of kinetic energy of the spherical sound waves that I may utilize, without the limitations met with in optical apparatus, and, this for all practical purposes, to an almost infinite degree.

This is diagrammatically shown in Fig. 11, where a number of intermediate or supplemental sound receivers, such as my improved megaphone transmitters, are employed in addition to the two "finding megaphones" that form the extremites of my acoustic base line. These intermediate sound receiving or gathering devices may, if desired, be strung close together along nearly the entire length of my movable arm containing the two "finding megaphones," but preferably I attach these behind suitable window openings formed along both the port and starboard sides of the vessel. In the latter case they are divided into forward and aft groups, and are connected at their several bases either with a sound-conveying tube common to each group, the sound-conveying tubes common to each forward and aft pair of groups connecting with one or more corresponding pairs of ear tubes; or if these groups of megaphones are of my microphone transmitter type, as illustrated in Fig. 11, their microphone terminals are connected in parallel with the two corresponding headphone circuits respectively. It will be seen that by this novel arrangement, practically the entire arc of the wave front embraced between the extreme right and left hand, or between the extreme fore and aft megaphone receivers, as the case may be, is compelled to give up the kinetic wave energy stored therein and to impress the same upon the sound receiving apparatus. It will further be observed that the energy so impressed upon the ears or upon the registering appliances through the plurality of separate megaphones is cumulative in character and in perfect attunement, since at distances great enough to warrant the cutting in of these intermediate megaphone receivers, that portion of the arc of the spherical sound wave corresponding to the length of the vessel, is practically a straight, flat surface, so that the crest of each succeeding atmospheric wave front will impinge simultaneously upon all the megaphones in perfect unison.

The next important consideration, aside from the increased sound-gathering power already mentioned, is that of the greater angular distance, or parallax, resulting from the increased base line obtained by my invention, as compared with that existing between a pair of ordinary ears. It is due to this greatly augmented base line, its independent, simple, and rapidly adjustable character, its complete manipulation by a single operator, its self-registering and self-indicating nature, and the fact that it automatically constitutes at all times, when focused upon a source of sound, the base of a true isosceles triangle, that it is capable of producing the novel and highly efficient results already referred to.

It is well known that, except for comparatively short distances, the ears are incapable of accurately locating the direction of a sound, and that they are moreover entirely incapable of determining, (in the absence of a previous knowledge of the intensity or character of a given sound) the distance over which it has traveled, or its point of origin. The sole exceptions to this rule are those cases where the sense of hearing is assisted by the sense of sight, as in estimating the distance or point of origin of a peal of thunder or the firing of a cannon, by the accompanying flash of light or smoke. It is likewise known that the direction of an echo from an iceberg enveloped in fog is difficult to determine by the ear, and that the same holds true in the matter of determining the location of a vessel sounding its whistle when the vessel is hidden by fog. That is to say, it is always difficult for the ear to judge of the direction of a sound, even though a short distance off, when the source is invisible, and this irrespective of the presence or absence of extraneous conditions, such as those due to refraction, rarefaction, precipitation, direction of wind, etc.

This difficulty is due chiefly to the exceedingly small distance separating the two ears, coupled with the comparatively long wave lengths of ordinary sound vibrations. The former is productive of a parallax having a very minute angle, so that for distant sounds the two ears substantially resolve themselves into a single auditory unit, just as the two eyes see objects in the foreground in stereoscopic relief while objects in the distance appear to blend and produce an impression of flatness to the view. The latter, the long wave lengths, prevent the natural ears from perceiving and differentiating the inequalities in the intensity of sound when one ear is somewhat in advance of the other in the line of the direction of propagation of the waves, thereby failing to note the interference effects due to waves separated by a considerable number of intervening waves. Such variations in intensity and interference effects, however, are readily perceived by my apparatus, when my "finder megaphones" with the wide angle parallax due to their longer base line, are caused to swing about their central support, as shown in Fig. 19.

On referring to this figure, it will at once be seen why the wide parallax and long spread of the pivoted cross-arm comprising my movable base line are more efficient and sensitive in this respect. The swinging of the cross-arm so that one megaphone receiver is considerably in advance of the other with respect to the source of sound, is productive of an acoustic discord or interference in hearing and a lack of coördination substantially analogous to that which would be produced by a pair of binocular field glasses, in which one of the two eye-pieces were out of focus. The combined visual result would in such case be blurred instead of being sharp and well-defined. Thus, by the simple expedient of swinging my cross-arm into a position where the same concentric wave front strikes against the mouth of both my megaphone receivers simultaneously, such discord or interference effects are destroyed and give place to a perfect attunement.

Furthermore, the angle subtended from the ears is smaller than that represented by the arc of the wave front that is embraced within the spread of the megaphone receivers, so that even at the greater distance of the latter the distance of the source can be far more readily ascertained from the angle.

Again, an echo from an iceberg cannot at present be heard by a person on board ship, even where the distance is short, unless the berg presents its principal face or wall toward the ship in such a manner that the sound from the vessel's fog-horn, whistle or siren shall be reflected directly back to the vessel in the same straight line along which it was originally projected, just as a ball thrown against a stone wall will rebound into the thrower's hands only when it strikes the wall in a direction perpendicular to its face. In the majority of cases a hidden berg may lie directly ahead of the ship with its principal face inclined at an angle thereto, in which event the echo would fly off in an altogether different direction, so that while an echo is the surest possible indication of the presence of a berg, it is only under exceptionally rare circumstances that the conditions are such as would cause the echo to return to the ship that originated the sound.

Now, by means of my pivoted yard-arm, bearing the widely separated sound receivers and the centrally projecting siren, the arm or base may be swung about in a manner similar to that in which one would employ a searchlight, so that the sound from the siren can be projected in any direction within an arc of 180 degrees. In exploring for icebergs, for example, the arm would be swung about so as to be brought into a position parallel with some part of the hidden object, without changing the course of the vessel itself. In this position the sound from the siren will be projected directly against that part of the surface of the berg and the reflected sound or echo upon returning to the vessel will immediately be received with uniform intensity by the two receivers forming the extremities of my pivoted base line.

The presence as well as the direction of an iceberg or any other obstruction hidden from view by fog or thick weather, a rocky cliff or coast line, a derelict, a sailing vessel, a shore obstruction, an island lighthouse or a hidden beach or shoal over which the waves are breaking, all of which I have illustrated in Fig. 17, can thus be promptly ascertained by a vessel long before it can come into dangerous proximity to the same. When the direction of any given obstruction has been obtained by swinging the yard arm into parallelism therewith as just described, its distance from the vessel may be found by focusing the sound receivers upon the apparent source of the echoes, whereupon the automatic triangulation and direct reading of the corresponding figures on the scale 52, will at once show its position and distance from the ship.

No claims are herein made for the following features of the invention hereinbefore described and shown in the drawings as these are reserved for the subject of separate applications for patent, to wit:

The combination of a wireless transmitter key and telegraph register, illustrated in Fig. 13.

The apparatus for producing signals on shipboard or in other places, illustrated in Fig. 14.

The visual indicator comprising the sensitive flames used as illustrated in Fig. 8 in combination with telephone receivers and the special construction of generator of sound waves illustrated in Fig. 12.

While I have herein more particularly shown and described my invention as applied to the transmission and reception of signals through the atmosphere and to the determination and location of the exact distance and position of vessels and other objects upon sea and land especially when hidden from direct view it will be understood that I do not restrict myself to such uses of my invention, but may likewise employ the various devices and instrumentalities herein shown and described as well as obvious modifications of the same for underwater transmission and for the various objects and purposes heretofore mentioned.

When my invention is applied to the detection and reception of either audible or inaudible vibrations, or of signals, messages, etc., originating in or transmitted through water, my sound-gathering and magnifying receivers may be of any desired waterproof and water-pressure resisting construction. For such submarine work, I preferably provide the mouths of the funnels containing my microphone transmitters with a waterproof diaphragm upon which the vibrations impinge, and also balance the outer hydrostatic pressure of the water by means of compressed air, a portion of which latter is at the same time utilized to balance the inner aerostatic pressure upon both sides of the transmitter diaphragms, or each transmitter diaphragm may be mechanically operated from the main diaphragm. The main body of the funnels are made sufficiently heavy so as not to be sensibly affected either by the pressure of the water or by the vibrations, impulses or sound waves transmitted through the water, but the protecting diaphragm is of thinner and more flexible material, preferably of a non-corroding metal, that will respond to such vibrations, etc., and communicate the same to the microphone transmitters, which in turn operate the head phone or phones, or the indicating instruments, or both, as already described.

What I claim as my invention is:

1. A sound-locating apparatus comprising a pivotal swinging support, two separated sound-receivers mounted on said support at opposite sides of and substantially equal distances from its pivotal point, and means associated with said pivotal support and sound-receivers, for equalizing and comparing the relative intensities of the sounds collected by said receivers as the support is swung about its pivotal point, whereby both the direction and distance of the sound from the place of observation are directly indicated and ascertained.

2. A sound-locating apparatus for ascertaining the direction and distance of a source of sound, comprising two sound-collecting and concentrating devices pivotally mounted respectively at the opposite extremities of a centrally pivoted support constituting an exploring, movable base-line, a pair of microphone transmitters responsive to the sound waves impinging upon said devices respectively, and means including a scale coöperating with said transmitters and responsive to the vibrations set up therein, the whole being so arranged and constructed that when the sound-collecting devices are so turned as to be simultaneously and equally affected by the same successive sound waves, the point of origin of such sound is indicated.

3. A sound direction indicating apparatus comprising two separately pivoted sound collecting funnels mounted on a swinging support, a telephone transmitter mounted at the base of each funnel and receiving the sounds collected thereby and telephone receiving apparatus for detecting the variation of the intensity of the sounds received by the two transmitters.

4. Means for locating the distance and direction of a source of sound, comprising a scale, a pair of sound receivers mounted on a pivotal support adjustable into position to make the line connecting said receivers the base line of an isosceles triangle whose apex is the point from which the sound emanates, said receivers being rotatively mounted upon said support so that they may be focused upon said distant point.

5. Means for locating the distance and direction of a source of sound, comprising a pair of sound receivers mounted on a pivotal support adjustable into position to make the line connecting said receivers the base line of an isosceles triangle whose apex is the point from which the sound emanates, said receivers being rotatively mounted upon said support so that they may be focused upon said distant point, means for ascertaining the angle of the receivers to the base line, and a scale adjusted by the turning movement of the sound receivers upon their support, said scale being calibrated to indicate the distance of the apex of the triangle from said base line.

6. A distance and direction indicating instrument comprising a pair of sound-gathering funnels or mouthpieces mounted upon an adjustable support adapted to turn on a center between said mouth pieces to vary the position of a base line connecting said mouthpieces, means for turning said funnels upon said support independently of the adjustment for the support of orientation, and for focusing them upon a distant source of sound and means for indicating the angle of said funnels to the base line when they are turned to position to produce a sound of substantially equal intensity and attunement.

7. Means for ascertaining the direction and distance of a source of sound comprising a pair of megaphone receiving funnels, each provided with a microphone transmitter and mounted upon a pivotal support whereby they may be turned together in a horizontal plane to bring a base line connecting them into position perpendicular to a line described from the source of sound and intersecting said base line, means for adjusting said funnels upon the support to focus them upon the source of sound and telephone receiving apparatus connected with said transmitters for indicating when the said mouthpieces are focused and means for reading the angle of the mouthpieces to said base lines.

8. An acoustic range finder for ascertaining the direction and distance of a distant source of sound, the same comprising a centrally pivoted exploring arm having a pair of sound-receivers pivotally mounted at opposite extremities thereof, the said arm constituting the base of an isosceles triangle whose apex is the source of sound, means for rotating the arm with its sound-receivers about its central support to any desired degree, for focusing the sound-receivers upon the source of sound in order to ascertain its distance from the point of observation, a pointer and a graduated indicating scale associated therewith, said scale being calibrated, whereby the range of the source of sound is directly shown by the indicating devices when the corresponding wave fronts of the oncoming spherical sound waves strike the mouths of the adjustable sound-receivers simultaneously and in synchronism.

9. The method of ascertaining the distance of an object, consisting in originating or producing sound at the place of observation, gathering the reflected sound at widely separated points at such place of observation and noting the distance of the object by the angle described by the axis of the sound-gathering devices to a base line connecting them when they are turned upon the base line to focus upon the distant object.

10. The combination in a sound exploring and locating apparatus, of a dual set of sound-gathering devices arranged at the front and rear, respectively, of a swinging support capable of being turned through an angle of approximately 180 degrees on an axis transverse to said base line, and means for directing the mouths of said receivers, within the limits of movement of said support, toward distant sources of sound emanating from positions ahead and behind any given position of said swinging support.

11. A sound projecting apparatus comprising a siren, an elongated sound projecting horn or trumpet extending therefrom mounted upon a swiveled or pivoted support capable of turning in a horizontal plane and sound receiving devices mounted on said support at the extremities of a horizontal base line connecting them and adapted to collect the echo of the projected sound and means for indicating the relative intensity and attunement of the collected sound in the different positions of the support when turned on its axis.

12. A sound direction indicating apparatus comprising two sound collecting surfaces each pivotally mounted at opposite extremities of a common support, means for transmitting the sounds collected by said surfaces to the ears of an observer, means for focusing said sound collecting surfaces upon a common source of sound, and a pointer associated with said support to indicate the point of origin of the sound when the sound collecting surfaces are each turned in the direction of the source of said sound.

13. A sound projecting apparatus comprising a sound-reflecting concentrator and a siren or other sound-producing instrument mounted within the focus thereof combined with a pair of receivers angularly adjustable at either side thereof as and for the purpose described.

14. An acoustic range finder comprising a pair of amplifying receivers pivotally mounted near the extremities of a support constituting the base line of an isosceles triangle, a hand lever connected with said receivers to swing their mouths toward or away from each other and a scale calibrated to the angular relations of the axes of said receivers and base line to determine the distance of a source of sound.

15. An apparatus for receiving and locating the point of origin of vibrations transmitted through a suitable medium, comprising a centrally pivoted supporting arm or base, capable of being turned to any desired extent, about its pivotal bearing, a pair of receivers responsive to such vibrations, the same being pivotally mounted, respectively, near the extremities of said arm or base at substantially equal distances from its central support, said receivers being operatively connected to permit them to be simultaneously turned upon said arm with their axis inclined toward each other at any desired or variable angle, in such a manner that when so inclined said centrally pivoted support will constitute the base line of an isosceles triangle the sides of which pass through the longitudinal axes of said pivoted receivers.

Signed at New York in the county of New York and State of New York this 19th day of June, A. D. 1912.

ELIAS E. RIES.

Witnesses:
F. B. TOWNSEND,
IRENE LEFKOWITZ.